(12) United States Patent
Johnson et al.

(10) Patent No.: US 8,135,842 B1
(45) Date of Patent: Mar. 13, 2012

(54) INTERNET JACK

(75) Inventors: Michael W. Johnson, Livermore, CA (US); John S. Minami, Honolulu, HI (US); Ryo Koyama, Palo Alto, CA (US); Landon Gentry, Scotts Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2662 days.

(21) Appl. No.: 10/049,972

(22) PCT Filed: Aug. 16, 2000

(86) PCT No.: PCT/US00/22476
§ 371 (c)(1),
(2), (4) Date: Feb. 13, 2002

(87) PCT Pub. No.: WO01/13583
PCT Pub. Date: Feb. 22, 2001

(51) Int. Cl.
*G06F 15/16* (2006.01)
(52) U.S. Cl. ....................................................... 709/227
(58) Field of Classification Search .................. 709/200, 709/204–207, 227–229; 370/351–356
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | |
| 4,839,851 A | 6/1989 | Maki | |
| 5,012,489 A | 4/1991 | Burton et al. | 375/8 |
| 5,056,058 A | 10/1991 | Hirata et al. | |
| 5,161,193 A | 11/1992 | Lampson et al. | 380/49 |
| 5,163,131 A | 11/1992 | Row et al. | |
| 5,303,344 A | 4/1994 | Yokoyama et al. | 395/200 |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |
| 5,455,599 A | 10/1995 | Cabral et al. | |
| 5,485,460 A | 1/1996 | Schrier et al. | |
| 5,495,480 A | 2/1996 | Yoshida | 370/60 |

(Continued)

FOREIGN PATENT DOCUMENTS

JP    11196187 A    *  2/1998

(Continued)

OTHER PUBLICATIONS

Martin et al. "An Alternative to Government Regulation and Censorship: Content Advisory Systems for the Internet." Jul. 7, 1997.http://penta2.ufrgs.br/gereseg/censura/rsac/dianne1.htm    Recreational Software Advisory Council, pp. 1-11.*

(Continued)

*Primary Examiner* — Wing Chan
*Assistant Examiner* — Alicia Baturay
(74) *Attorney, Agent, or Firm* — Zilka-Kotab, PC (57) ABSTRACT

The claimed invention herein provides a simple, economical, and safe way to connect a new class of Internet-ready devices and appliances to the Internet without the use of a personal computer (PC). The claimed invention herein provides an Internet dial-tone, so to speak, to applications ranging from toys and entertainment consoles to electronic books and health equipment just as a traditional telephone jack provides a plain old telephone system (POTS) dial-tone for phones, modems, and fax machines. The invention herein features a modem, network stack, and application protocols alleviating the need for sophisticated logic within attached devices. With one-touch, appliances can quickly and easily connect to the Internet.

56 Claims, 3 Drawing Sheets

U.S. PATENT DOCUMENTS

| | | | | |
|---|---|---|---|---|
| 5,499,353 | A | 3/1996 | Kadlec et al. | 395/445 |
| 5,513,324 | A | 4/1996 | Dolin, Jr. et al. | 395/200.18 |
| 5,519,704 | A | 5/1996 | Farinacci et al. | 370/85.13 |
| 5,544,357 | A | 8/1996 | Huei | |
| 5,546,453 | A | 8/1996 | Hebert | 379/242 |
| 5,566,170 | A | 10/1996 | Bakke et al. | 370/60 |
| 5,577,105 | A | 11/1996 | Baum et al. | 379/93 |
| 5,577,172 | A | 11/1996 | Vatland et al. | 395/114 |
| 5,577,237 | A | 11/1996 | Lin | 395/555 |
| 5,581,686 | A | 12/1996 | Koppolu et al. | |
| 5,596,702 | A | 1/1997 | Stucka et al. | |
| 5,598,410 | A | 1/1997 | Stone | 370/469 |
| 5,619,650 | A | 4/1997 | Bach et al. | 395/200.01 |
| 5,621,434 | A | 4/1997 | Marsh | |
| 5,625,678 | A | 4/1997 | Blomfield-Brown | 379/93 |
| 5,625,825 | A | 4/1997 | Rostoker et al. | 395/730 |
| 5,634,015 | A | 5/1997 | Chang et al. | 395/309 |
| 5,636,371 | A | 6/1997 | Yu | 395/500 |
| 5,640,394 | A | 6/1997 | Schrier et al. | 370/389 |
| 5,650,941 | A | 7/1997 | Coelho et al. | |
| 5,663,951 | A | 9/1997 | Danneels et al. | 370/230 |
| 5,664,162 | A | 9/1997 | Dye | |
| 5,666,362 | A | 9/1997 | Chen et al. | 370/420 |
| 5,675,507 | A | 10/1997 | Bobo, II | 364/514 R |
| 5,678,060 | A | 10/1997 | Yokoyama et al. | |
| 5,680,605 | A | 10/1997 | Torres | |
| 5,687,314 | A | 11/1997 | Osman et al. | 395/200.01 |
| 5,696,899 | A | 12/1997 | Kalwitz | 395/200.1 |
| 5,699,350 | A | 12/1997 | Kraslavsky | 370/254 |
| 5,701,316 | A | 12/1997 | Alferness et al. | 371/53 |
| 5,726,769 | A * | 3/1998 | Imai et al. | 358/442 |
| 5,727,149 | A | 3/1998 | Hirata et al. | 395/200.8 |
| 5,734,852 | A | 3/1998 | Zias et al. | |
| 5,734,865 | A | 3/1998 | Yu | 395/500 |
| 5,748,905 | A | 5/1998 | Hauser et al. | 395/200.79 |
| 5,754,540 | A | 5/1998 | Liu et al. | 370/315 |
| 5,754,556 | A | 5/1998 | Ramseyer et al. | |
| 5,761,281 | A | 6/1998 | Baum et al. | 379/93.29 |
| 5,778,178 | A | 7/1998 | Arunachalam | |
| 5,790,546 | A | 8/1998 | Dobbins et al. | 370/400 |
| 5,790,676 | A | 8/1998 | Ganesan et al. | 380/23 |
| 5,802,278 | A | 9/1998 | Isfeld et al. | 395/200.02 |
| 5,802,287 | A | 9/1998 | Rostoker et al. | |
| 5,802,306 | A | 9/1998 | Hunt | 395/200.58 |
| 5,805,816 | A | 9/1998 | Picazo, Jr. et al. | 395/200.53 |
| 5,809,235 | A | 9/1998 | Sharma et al. | 395/200.6 |
| 5,815,516 | A | 9/1998 | Aaker et al. | 371/53 |
| 5,818,935 | A | 10/1998 | Maa | 380/20 |
| 5,826,032 | A | 10/1998 | Finn et al. | 395/200.66 |
| 5,847,698 | A * | 12/1998 | Reavey et al. | 345/173 |
| 5,854,750 | A | 12/1998 | Phillips et al. | |
| 5,870,549 | A | 2/1999 | Bobo, II | |
| 5,870,622 | A | 2/1999 | Gulick et al. | |
| 5,872,919 | A | 2/1999 | Wakeland | 395/200.6 |
| 5,877,764 | A | 3/1999 | Feitelson et al. | |
| 5,894,557 | A | 4/1999 | Bade et al. | 395/200.58 |
| 5,901,287 | A * | 5/1999 | Bull et al. | 709/218 |
| 5,905,582 | A * | 5/1999 | Hirai et al. | 358/468 |
| 5,909,546 | A | 6/1999 | Osborne | 395/200.42 |
| 5,918,051 | A | 6/1999 | Savitzky et al. | |
| 5,920,732 | A | 7/1999 | Riddle | 395/876 |
| 5,923,892 | A | 7/1999 | Levy | |
| 5,935,268 | A | 8/1999 | Weaver | 714/758 |
| 5,937,169 | A | 8/1999 | Connery et al. | 395/200.8 |
| 5,941,988 | A | 8/1999 | Bhagwat et al. | 713/201 |
| 5,943,481 | A | 8/1999 | Wakeland | 395/200.6 |
| 5,946,487 | A | 8/1999 | Dangelo | |
| 5,966,534 | A | 10/1999 | Cooke et al. | |
| 5,968,161 | A | 10/1999 | Southgate | |
| 5,974,518 | A | 10/1999 | Nogradi | 711/173 |
| 5,987,582 | A | 11/1999 | Devic | |
| 5,991,299 | A | 11/1999 | Radogna et al. | |
| 5,999,974 | A | 12/1999 | Ratcliff et al. | 709/224 |
| 6,012,961 | A * | 1/2000 | Sharpe et al. | 446/298 |
| 6,014,699 | A | 1/2000 | Ratcliff et al. | 709/224 |
| 6,034,963 | A * | 3/2000 | Minami et al. | 370/401 |
| 6,038,595 | A * | 3/2000 | Ortony | 709/218 |
| 6,046,980 | A | 4/2000 | Packer | 370/230 |
| 6,049,857 | A | 4/2000 | Watkins | |
| 6,058,421 | A * | 5/2000 | Fijolek et al. | 709/225 |
| 6,061,368 | A | 5/2000 | Hitzelberger | |
| 6,061,742 | A | 5/2000 | Stewart et al. | 709/250 |
| 6,076,115 | A | 6/2000 | Sambamurthy et al. | 709/250 |
| 6,078,736 | A | 6/2000 | Guccione | |
| 6,081,846 | A | 6/2000 | Hyder et al. | 709/250 |
| 6,092,110 | A | 7/2000 | Maria et al. | 709/225 |
| 6,092,229 | A | 7/2000 | Boyle et al. | 714/748 |
| 6,094,657 | A * | 7/2000 | Hailpern et al. | 707/103 R |
| 6,098,188 | A | 8/2000 | Kalmanek, Jr. et al. | 714/746 |
| 6,101,543 | A | 8/2000 | Alden et al. | 709/229 |
| 6,151,625 | A | 11/2000 | Swales et al. | 709/218 |
| 6,157,955 | A | 12/2000 | Narad et al. | 709/228 |
| 6,157,956 | A * | 12/2000 | Jensen et al. | 709/246 |
| 6,172,980 | B1 | 1/2001 | Flanders et al. | 370/401 |
| 6,172,990 | B1 | 1/2001 | Deb et al. | 370/474 |
| 6,173,333 | B1 | 1/2001 | Jolitz et al. | 709/240 |
| 6,182,228 | B1 | 1/2001 | Boden et al. | 713/201 |
| 6,185,619 | B1 | 2/2001 | Joffe et al. | 709/229 |
| 6,208,651 | B1 | 3/2001 | Van Renesse et al. | |
| 6,226,680 | B1 | 5/2001 | Boucher et al. | |
| 6,230,193 | B1 | 5/2001 | Arunkumar et al. | 709/218 |
| 6,233,626 | B1 | 5/2001 | Swales et al. | 710/11 |
| 6,247,060 | B1 | 6/2001 | Boucher et al. | |
| 6,247,068 | B1 | 6/2001 | Kyle | |
| 6,290,565 | B1 * | 9/2001 | Galyean III et al. | 446/99 |
| 6,290,566 | B1 * | 9/2001 | Gabai et al. | 446/175 |
| 6,319,010 | B1 * | 11/2001 | Kikinis | 434/169 |
| 6,327,625 | B1 | 12/2001 | Wang et al. | |
| 6,330,659 | B1 | 12/2001 | Poff et al. | |
| 6,331,865 | B1 * | 12/2001 | Sachs et al. | 715/776 |
| 6,334,153 | B2 | 12/2001 | Boucher et al. | |
| 6,341,129 | B1 | 1/2002 | Schroeder et al. | |
| 6,345,301 | B1 | 2/2002 | Burns et al. | |
| 6,347,347 | B1 | 2/2002 | Brown et al. | |
| 6,363,418 | B1 * | 3/2002 | Conboy et al. | 709/218 |
| 6,377,570 | B1 * | 4/2002 | Vaziri et al. | 370/352 |
| 6,389,479 | B1 * | 5/2002 | Boucher et al. | 709/243 |
| 6,389,537 | B1 | 5/2002 | Davis et al. | |
| 6,393,487 | B2 | 5/2002 | Boucher et al. | |
| 6,397,316 | B2 | 5/2002 | Fesas, Jr. | |
| 6,427,169 | B1 | 7/2002 | Elzur | |
| 6,427,171 | B1 | 7/2002 | Craft et al. | |
| 6,427,173 | B1 | 7/2002 | Boucher et al. | |
| 6,430,628 | B1 | 8/2002 | Connor | |
| 6,434,620 | B1 | 8/2002 | Boucher et al. | |
| 6,446,192 | B1 * | 9/2002 | Narasimhan et al. | 712/29 |
| 6,460,080 | B1 | 10/2002 | Shah et al. | |
| 6,470,415 | B1 | 10/2002 | Starr et al. | |
| 6,480,852 | B1 * | 11/2002 | Himmel et al. | 707/10 |
| 6,510,458 | B1 | 1/2003 | Berstis et al. | 709/219 |
| 6,519,247 | B1 * | 2/2003 | Yoshida | 370/352 |
| 6,530,061 | B1 | 3/2003 | Labatte | |
| 6,567,855 | B1 * | 5/2003 | Tubbs et al. | 709/232 |
| 6,572,431 | B1 * | 6/2003 | Maa | 446/301 |
| 6,591,302 | B2 | 7/2003 | Boucher et al. | |
| 6,609,225 | B1 | 8/2003 | Ng | |
| 6,625,147 | B1 | 9/2003 | Yokoyama et al. | |
| 6,629,141 | B2 | 9/2003 | Elzur et al. | |
| 6,658,480 | B2 | 12/2003 | Boucher et al. | |
| 6,687,758 | B2 | 2/2004 | Craft et al. | |
| 6,697,868 | B2 | 2/2004 | Craft et al. | |
| 6,713,201 | B2 * | 3/2004 | Bullock et al. | 429/12 |
| 6,751,665 | B2 | 6/2004 | Philbrick et al. | |
| 6,757,746 | B2 | 6/2004 | Boucher et al. | |
| 6,765,901 | B1 * | 7/2004 | Johnson et al. | 370/352 |
| 6,773,344 | B1 * | 8/2004 | Gabai et al. | 463/1 |
| 6,800,013 | B2 * | 10/2004 | Liu | 446/297 |
| 6,807,581 | B1 | 10/2004 | Starr et al. | |
| 6,826,615 | B2 | 11/2004 | Barrall et al. | |
| 6,938,092 | B2 | 8/2005 | Burns | |
| 6,941,386 | B2 | 9/2005 | Craft et al. | |
| 6,949,002 | B2 * | 9/2005 | Yamaguchi et al. | 446/454 |
| 6,965,941 | B2 | 11/2005 | Boucher et al. | |
| 6,980,559 | B2 | 12/2005 | Kichise | |
| 6,983,357 | B2 | 1/2006 | Poff et al. | |
| 6,996,070 | B2 | 2/2006 | Starr et al. | |
| 7,039,717 | B2 * | 5/2006 | Johnson | 709/237 |

| | | |
|---|---|---|
| 7,165,112 B2 | 1/2007 | Battin et al. |
| 7,167,927 B2 | 1/2007 | Philbrick et al. |
| RE39,501 E | 3/2007 | Minami et al. |
| 7,302,499 B2 | 11/2007 | Johnson |
| 7,330,918 B2 | 2/2008 | Yamamoto et al. |
| 7,483,375 B2 | 1/2009 | Johnson et al. |
| 7,535,913 B2 | 5/2009 | Minami et al. |
| 7,587,470 B2 | 9/2009 | Johnson |
| 7,996,568 B2 | 8/2011 | Johnson et al. |
| 2001/0011233 A1* | 8/2001 | Narayanaswami .............. 705/26 |
| 2001/0021949 A1 | 9/2001 | Blightman et al. |
| 2001/0023460 A1 | 9/2001 | Boucher et al. |
| 2001/0027496 A1 | 10/2001 | Boucher et al. |
| 2001/0030958 A1 | 10/2001 | Kichise |
| 2001/0036196 A1 | 11/2001 | Blightman et al. |
| 2001/0037397 A1 | 11/2001 | Boucher et al. |
| 2001/0037406 A1 | 11/2001 | Philbrick et al. |
| 2001/0047433 A1 | 11/2001 | Boucher et al. |
| 2002/0055993 A1 | 5/2002 | Shah et al. |
| 2002/0085562 A1 | 7/2002 | Hufferd et al. |
| 2002/0087732 A1 | 7/2002 | Boucher et al. |
| 2002/0091831 A1 | 7/2002 | Johnson |
| 2002/0091844 A1 | 7/2002 | Craft et al. |
| 2002/0095519 A1 | 7/2002 | Philbrick et al. |
| 2002/0120899 A1 | 8/2002 | Gahan et al. |
| 2002/0147839 A1 | 10/2002 | Boucher et al. |
| 2002/0156927 A1 | 10/2002 | Boucher et al. |
| 2002/0161919 A1 | 10/2002 | Boucher et al. |
| 2002/0163888 A1 | 11/2002 | Grinfeld |
| 2002/0188839 A1 | 12/2002 | Noehring et al. |
| 2003/0005142 A1 | 1/2003 | Elzur et al. |
| 2003/0005143 A1 | 1/2003 | Elzur et al. |
| 2003/0014544 A1 | 1/2003 | Pettey |
| 2003/0016669 A1 | 1/2003 | Pfister et al. |
| 2003/0031172 A1 | 2/2003 | Grinfeld |
| 2003/0046330 A1 | 3/2003 | Hayes |
| 2003/0046418 A1 | 3/2003 | Raval et al. |
| 2003/0056009 A1 | 3/2003 | Mizrachi et al. |
| 2003/0058870 A1 | 3/2003 | Mizrachi et al. |
| 2003/0061505 A1 | 3/2003 | Sperry et al. |
| 2003/0066011 A1 | 4/2003 | Oren |
| 2003/0079033 A1 | 4/2003 | Craft et al. |
| 2003/0081599 A1 | 5/2003 | Wu et al. |
| 2003/0084185 A1 | 5/2003 | Pinkerton |
| 2003/0095567 A1 | 5/2003 | Lo et al. |
| 2003/0115350 A1 | 6/2003 | Uzrad-Nali et al. |
| 2003/0115417 A1 | 6/2003 | Corrigan |
| 2003/0128704 A1 | 7/2003 | Mizrachi et al. |
| 2003/0140124 A1 | 7/2003 | Burns |
| 2003/0145101 A1 | 7/2003 | Mitchell et al. |
| 2003/0145270 A1 | 7/2003 | Holt |
| 2003/0165160 A1 | 9/2003 | Minami et al. |
| 2003/0167346 A1 | 9/2003 | Craft et al. |
| 2003/0200284 A1 | 10/2003 | Philbrick et al. |
| 2004/0003126 A1 | 1/2004 | Boucher et al. |
| 2004/0054813 A1 | 3/2004 | Boucher et al. |
| 2004/0062246 A1 | 4/2004 | Boucher et al. |
| 2004/0062267 A1 | 4/2004 | Minami et al. |
| 2004/0064578 A1 | 4/2004 | Boucher et al. |
| 2004/0064589 A1 | 4/2004 | Boucher et al. |
| 2004/0064590 A1 | 4/2004 | Starr et al. |
| 2004/0073703 A1 | 4/2004 | Boucher et al. |
| 2004/0078462 A1 | 4/2004 | Philbrick et al. |
| 2004/0088262 A1 | 5/2004 | Boucher et al. |
| 2004/0100952 A1 | 5/2004 | Boucher et al. |
| 2004/0111535 A1 | 6/2004 | Boucher et al. |
| 2004/0117509 A1 | 6/2004 | Craft et al. |
| 2004/0158640 A1 | 8/2004 | Philbrick et al. |
| 2004/0158793 A1 | 8/2004 | Blightman et al. |
| 2004/0190512 A1 | 9/2004 | Schultz |
| 2004/0213290 A1* | 10/2004 | Johnson et al. .............. 370/469 |
| 2004/0240435 A1 | 12/2004 | Boucher et al. |
| 2005/0117582 A1 | 6/2005 | Biran et al. |
| 2005/0122986 A1 | 6/2005 | Starr et al. |
| 2005/0141561 A1 | 6/2005 | Craft et al. |
| 2005/0160139 A1 | 7/2005 | Boucher et al. |
| 2005/0175003 A1 | 8/2005 | Craft et al. |
| 2005/0182841 A1 | 8/2005 | Sharp |
| 2005/0198198 A1 | 9/2005 | Craft et al. |
| 2005/0204058 A1 | 9/2005 | Philbrick et al. |
| 2005/0223110 A1 | 10/2005 | Honary et al. |
| 2005/0226144 A1 | 10/2005 | Okita |
| 2005/0249245 A1* | 11/2005 | Hazani et al. .............. 370/485 |
| 2005/0271042 A1 | 12/2005 | Johnson |
| 2005/0278459 A1 | 12/2005 | Boucher et al. |
| 2006/0010238 A1 | 1/2006 | Craft et al. |
| 2006/0031818 A1 | 2/2006 | Poff et al. |
| 2006/0168281 A1 | 7/2006 | Starr et al. |
| 2007/0030861 A1 | 2/2007 | Johnson et al. |
| 2007/0044002 A1 | 2/2007 | Johnson et al. |
| 2007/0055967 A1 | 3/2007 | Poff et al. |
| 2007/0058534 A1 | 3/2007 | Shimonishi et al. |
| 2007/0062245 A1 | 3/2007 | Fuller et al. |
| 2007/0253430 A1 | 11/2007 | Minami et al. |
| 2008/0034103 A1 | 2/2008 | Johnson |

FOREIGN PATENT DOCUMENTS

| | | |
|---|---|---|
| JP | 11313091 | 11/1999 |
| JP | 2000196669 | 7/2000 |
| TW | 447205 B | 7/2001 |
| TW | 448407 B | 8/2001 |
| WO | WO 9808344 A2 * | 2/1998 |
| WO | WO 98/21655 | 5/1998 |
| WO | WO 9808344 A2 * | 7/1999 |
| WO | 99/39488 | 8/1999 |
| WO | WO 9939488 A * | 8/1999 |
| WO | 99/65219 | 12/1999 |
| WO | 01/013583 A3 | 2/2001 |
| WO | WO 01/13583 | 2/2001 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |

OTHER PUBLICATIONS

Martin et al. "An Alternative to Government Regulation and Censorship: Content Advisory Systems for the Internet." Jul. 7, 1997. http://penta2.ufrgs.br/gereseg/censura/rsac/dianne1.htm Recreational Software Advisory Council, pp. 1-11.*

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Preston, David J., "Internet Protocols Migrate to Silicon for Networking Devices" Electronic Design Apr. 14, 1997.

Rang, Michael ad Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Doumenis, Gr.A., Konstantoulakis, G.E., Reisis, D.I.and Stassinopoulos, G.I. "A Personal Computer Hosted Terminal Adapter for the Broadband Integrated Services Digital Network and Applications" National Technical University of Athens, Greece.

Womack, Lucas;.Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: a Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization for A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Aleicios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sub layer and the ATM Layer in High-Speed Broadband ISDN Data Terminal Adapters" IEEE 1993.

Mora, F.; Sebastia, A., "Electronic Design of a High Performance Interface to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yasuhiro; Yamahsita, Hiroyuki, "High-Performance TCP/IP/ATM Communication Boards: Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9.

Wright, Maury "Intelligent Ethernet Boards" EDN Jun. 23, 1988.

Preston, David "Internet Protocols Migrate to Silicon for Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurements of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, Parallel Host Interface for an ATM Network IEEE Network Jul. 1993.

Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.

Laskman, T.V.; Madhow, U., "Performance Analysis of Window-based Flow Control using TCP/IP: Effect of High Bandwidth Delay Products and Random Loss" High Performance Networking V. 1994 IFIP.

Ramakrishnan, K.K., "Performance Considerations in Designing Network Interfaces" IEEE Journal1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the Shrimp Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" IEEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www. newmedianews.com/02197/ts_inettuner. html.

Kelly, T. "Cheap Internet Hardivare that Fits in Everything" ZDNet, www.zdnet.co.uk/news/1998/77/ns-5998.html.

iReady Product Data Sheet, Internet Tuner.

Kitadeya et al. "Matsushita Launches WebTV Internet Connection Terminal" www.mei.co.jp/corp/news/official.data.dir/en981112-1/en981112-1htm1.

Office Action Summary from U.S. Appl. No. 10/969,376 mailed on Dec. 27, 2007.

Agrawal, P. et al. "Architecture and Design of the MARS Hardware Accelerator," 24th ACM/IEEE Design Automation Conference, 1987, Paper 6.3, pp. 101-107.

8802-3:2000 ISO/IEC Information Technology—LAN/MAN, Part 3: Carrier Sense Multiple Access with Collision Detection, Jan. 2001.

Case, B., "Implementing the Java Virtual Machine: Java's Complex Instruction Set Can Be Built in Software or Hardware," Microprocessor Report, Microdesign Resources, Mar. 25, 1996, pp. 12-17.

Wayner, P., "Are Java Chips better than general-purpose CPU's? or will new compilers make them obsolete," Sun Gambles on Java Chips, Nov. 1996, pp. 1-10, retrieved from www.byte.com/art/9611/sec6/art2.htm on Dec. 22, 2004.

Sung, D. K., "Mobile Communications Systems (MCS)," EE624, Korea Advanced Institute of Science and Technology, Communication Network Research Lab, 2000, pp. 1-17.

Frazier, G. L. et al., "The Design and Implementation of a Multi-Queue Buffer for VLSI Communication Switches," Proceedings of the International Conference on Computer Design, Oct. 1989, pp. 466-471.

Majima, A. et al., "Development of Resource Reservation Mechanism for Multimedia Communication," Joho Shori Gakkai Kenkyu Hokoku, 2000, pp. 17-22, Japan.

Information technology—SCSI Architecture Model-2 (SAM-2), Draft Proposed American National Standard, T10/1157-D Revision 24, Sep. 12, 2002, pp. 1-102.

Non-Final Office Action from U.S. Appl. No. 10/969,376, dated Jul. 9, 2008.

Non-Final Office Action from U.S. Appl. No. 10/969,376, dated Jan. 7, 2009.

Non-Final Office Action from U.S. Appl. No. 10/969,376, dated Jul. 15, 2009.

Final Office Action from U.S. Appl. No. 10/969,376, dated Feb. 25, 2010.

Advisory Office Action from U.S. Appl. No. 10/969,376, dated May 5, 2010.

Notice of Allowance from U.S. Appl. No. 10/969,376, dated Jul. 16, 2010.

Non-Final Office Action from U.S. Appl. No. 10/969,376, dated Oct. 12, 2010.

Notice of Allowance from U.S. Appl. No. 10/969,376, dated Apr. 14, 2011.

Notice of Reasons for Rejection from Japanese Patent Application No. 2007-538074, dated Jun. 8, 2010.

Notice of Reasons for Final Rejection from Japanese Patent Application No. 2007-538074, dated Nov. 24, 2010.

Notice of Reasons for Rejection from Japanese Patent Application No. 2007-538074, dated Dec. 8, 2009.

Office Action from Chinese Patent Application No. 200580035744.6, dated Nov. 24, 2010.

Office Action from Chinese Patent Application No. 200580035744.6, dated Aug. 7, 2009 (English translation).

Notice of Preliminary Rejection form Korean Patent Application No. 10-20077008944, dated Sep. 13, 2010 (English translation).

Written Opinion and International Search Report form International Application No. PCT/US05/37941, dated Oct. 2, 2006.

Margolin, Bob, "Smarter Stuff" http://www.byte.com/art/9706/sec6/art2.htm , Jun. 1997.

Panian et al. "The IP Modem Interface Standard: Draft" Portable Computer Communications Association, Brookdale, CA., Jan. 11, 1999.

\* cited by examiner

INTERNET JACK

This application is a 371 National Stage Application of International Application No. PCT/US00/22476, filed Aug. 16, 2000, which claims the benefit of U.S. Provisional Application No. 60/149,214, filed Aug. 16, 1999.

BACKGROUND OF THE INVENTION

1. Technical Field

The present invention relates to Internet connections. More particularly, the present invention relates to a new connection platform for connecting to the Internet that provides an ease of use to a user as does a phone jack.

2. Description of the Prior Art

Internet Appliances Vs. Internet-Ready Appliances

Internet appliances already appear in the form of Web enabled televisions, screen phones, Web Tablets, and Email Readers, that take advantage of the Internet to send and receive data, browse Web sites, and other computer-type activities. Internet appliances may be characterized as requiring an Internet connection for primary usage, or as being permanently attached to an Internet link. In the latter case, the device may not need to be on-line continuously, but might always be attached to a phone jack or to some other Internet connection.

A new class of devices will soon emerge that will use the Internet to simply augment primary functions, and that will not require a permanent hook up to an Internet link nor will even require the Internet to function. Of such herein cited portable and/or Internet optional function devices (herein referred to interchangeably as Internet-ready devices or appliances), connection is required only when updating, sending, or receiving information. Internet-ready device categories may include, but are not limited to, toys, electronic books, personal health monitors, and MP-3 players, for example. A child's toy or an electronic book may need only to connect to a specific Web site when downloading new content. After downloading the content, the device may be taken anywhere to be played with or used. Other devices such as digital cameras may need only to be connected when sending pictures to a photo-developing center, to relatives, or to remote displays.

A notable characteristic of Internet-ready devices is that they are all mass market consumer electronic type products, and as such have very real cost and price constraints. It is noted that embedding necessary logic to connect a device to the Internet means adding a modem, a CPU, a network stack, memory, and miscellaneous glue logic to the device. While the costs of adding such components are decreasing, for example, adding $10-$20 in parts, it is noted that adding such cost to a device selling for $25 is probably not practical.

Using the PC as the Connection

Today the PC is used as an interfacing device for the new class of Internet-ready appliances. The percentage of households owning PC's continues to grow, making a PC a more prevalent platform on which to base a solution. An Internet enabled PC will already have a modem installed, along with a powerful processor, advanced operating system, and more than sufficient memory. The PC can easily accept new software drivers to communicate to attached devices, through serial ports, parallel ports, USB's, 1394's, or any other input-output (I/O) bus structure. However, there are many well-documented problems with the solution of using PC's as the connection, such problems including ease of use, cost, and security. These issues make the PC an expensive and cumbersome solution at best, and an intimidating and adoption hindrance in the worst case.

A computer, with all of the advances in technology, is the most sophisticated and technically complicated product in many households. Installing device drivers, successfully attaching an appliance, and configuring network connections are not for the faint of heart, and certainly not for the typical consumer electronics user. While driver installation is automated in recent releases, resolving driver conflicts and configuring parameters is not a task with which most users can cope. If an Internet-ready device is a child's toy, the process described herein above would most likely require adult supervision or visa-versa in many homes. Therefore, the process may be one that could not be performed by anyone. Technophobia may be enough to keep the solution of installing device drivers, successfully attaching an appliance, and configuring network connections from becoming the one of choice.

Cost is another major concern with using the PC as the connection platform. While a more than capable PC can be obtained for well under $1000 today, the price tag is still beyond the point where people can afford to put one in every room of the house. Clearly, a proper solution is one in which the price of the connection feature makes it possible for homes to have multiple ports. The price of a telephone is a good analogy. When the cost of a phone was relatively high, most families had one phone centrally located within the home. As the cost of a phone dropped, people began putting one in every bedroom, the den, and even the bathroom.

Security and data integrity is another issue with using computers as the Internet connection platform. Various entry points in the upload and download process can be altered by users because the computer is not a closed system, thereby possibly violating the intended use by manufacturers. Take, for example, imagining a parent's concern if adult audio clips are downloaded into talking toys, or if downloadable game consoles access unauthorized pirate sites. These are concerns that also worry manufacturers of Internet-ready appliances, because it's their image, reputation, and revenues that are affected. Safe guards, such as, for example, the RSAC initiative, help in providing a process by which only intended content may be downloaded. However, this type of rating scheme depends upon compliant browsers and upon proper browser setup to be effective. Also, such rating scheme cited herein above does not prevent a user from accessing unauthorized sites.

Clearly, a new connection platform is needed to service the class of Internet-ready appliances. The new connection platform must meet required cost, security, and ease of use points that today are lacking in a computer oriented solution. At the same time the new connection platform must provide a standard connection port and must offer performance levels to which consumer electronic users have become accustomed. System crashes and long boot times are accepted behaviors in a PC world, however, are causes for product returns for normal personal electronics. It would therefore be advantageous to provide a preferred solution that is as stable as a television, and as cost affordable as a telephone.

It would be advantageous to provide a new connection platform that makes it possible to have such a new connection platform for each possible Internet connection point in the home, whether the possible Internet connection point is a telephone jack, cable connection, or other means.

It would be advantageous to provide a new connection platform system that is closed. That is, at no point does a user have to intervene or provide any additional information.

When such a system is closed, the Internet connection only goes to the site specified by the appliance.

It is noted that the prior art is using PC's as the connection to the Internet.

It is also noted that prior art combines Internet related components into one device, such as, for example, the Web TV box that contains, but is not limited to, a modem, protocol handler, network stack, Internet interface and telephone interface.

SUMMARY OF THE INVENTION

The claimed invention herein provides a simple, economical, and safe way to connect a new class of Internet-ready devices and appliances to the Internet without the use of a personal computer (PC). The claimed invention herein provides an Internet dial-tone, so to speak, to applications ranging from toys and entertainment consoles to electronic books and health equipment just as a traditional telephone jack provides a plain old telephone system (POTS) dial-tone for phones, modems, and fax machines. The invention herein features a modem, network stack, and application protocols alleviating the need for sophisticated logic within attached devices. With one-touch, appliances can quickly and easily connect to the Internet.

DETAILED DESCRIPTION OF THE INVENTION

The claimed invention herein provides a simple, economical, and safe way to connect a new class of Internet-ready devices and appliances to the Internet without the use of a personal computer (PC). The claimed invention herein provides an Internet dial-tone, so to speak, to applications ranging from toys and entertainment consoles to electronic books and health equipment just as a traditional telephone jack provides a plain old telephone system (POTS) dial-tone for phones, modems, and fax machines. The invention herein features a modem, network stack, and application protocols alleviating the need for sophisticated logic within attached devices. With one-touch, appliances can quickly and easily connect to the Internet.

The Internet Jack

The claimed invention herein, also referred to herein as an Internet Jack, fulfills the need for a new connection platform discussed herein above in the Background section. The invention is generic enough to support a wide variety of devices from entertainment products to health equipment. Using the invention, any device requiring Internet connectivity is able to plug into an Internet Jack just as any device requiring power may be plugged into an AC outlet. The Internet Jack provides an Internet dial tone that furnishes a well-defined set of features and/or services and is similar to a telephone or cable TV jack. These services include, but are not limited to, providing a platform for Internet connectivity, all network protocol processing, and standard data decoding. Because these services are provided in a separate jack that can be used by a multitude and variety of products, the added cost of providing these services are removed from Internet-ready appliances. Therefore, adding such services and/or features through the claimed invention is much more practical and economical for mainstream consumer electronic products, than adding them to the products themselves.

The preferred embodiment the invention has a minimum of two connection ports. One port attaches to a telephone or other Internet conduit. The second port is used for any Internet-ready device to attach. A simple one-touch operation allows a user to easily connect the device to the Internet, and thereby retrieve or send data. An indicator is provided on the claimed invention to inform the user when the desired operation is complete. Because the invention is designed for the purpose of providing Internet connectivity for this new class of Internet-ready appliances, its user interface is streamlined in such a way that any person familiar with plugging in electronic products into wall outlets can perform the operation. Display indicators on the invention can range, for example, from simple light emitting diodes (LED's) to small liquid crystal displays (LCD) screens that inform users on the status of operations. Ease of use is a main design criterion of the invention.

Figure 1:
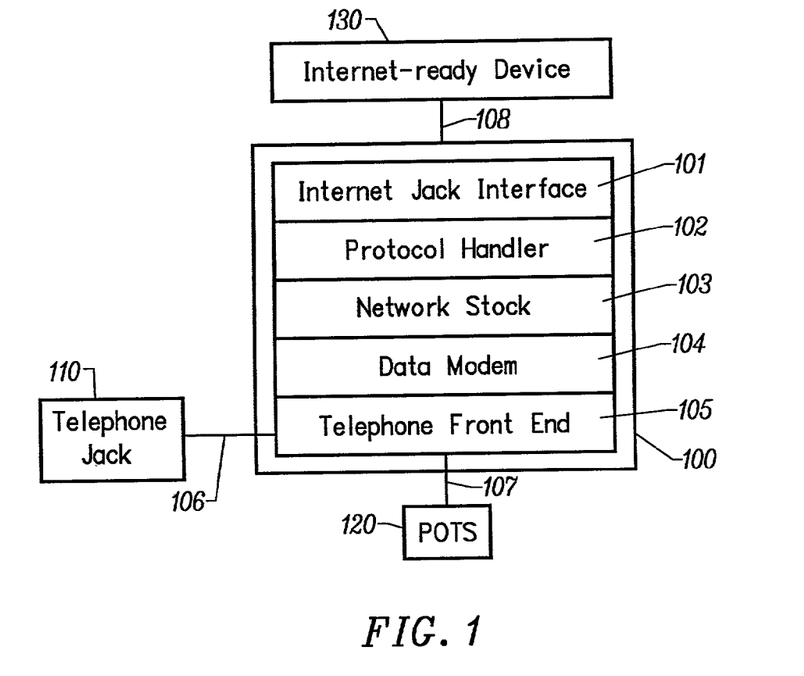
FIG. 1 is a block diagram of a preferred embodiment of the claimed invention herein showing the invention for a telephone connection.

FIG. 1 is a block diagram of a preferred embodiment of the claimed invention herein showing the invention for a telephone connection. The invention 100 connects to a standard telephone jack 110 by a connection 106 from a telephone front end logical component 105, provides a plug 107 for a telephone 120 from the telephone front end logical component 105, and a connection 108 to an Internet-ready device from an Internet jack interface logical component 101 of the invention 100. A data modem logical component 104 is provided. The data modem 104 used in the preferred embodiment ranges from 2400 bps to 56 kbps, and to xDSL and cable modems, depending on desired performance level and cost target of the invention. A network stack logical component 103 is provided. In the preferred embodiment it handles all TCP/IP and data link layer protocols needed for Internet connectivity. A protocol handler logical component 102 is provided that, in the preferred embodiment, provides built in support for POP3, SMTP, FTP, and HTTP. These protocols cited herein are standard methods by which data is transferred over the Internet today. In addition to these protocols, the invention herein 100 provides DNS support for resolving server names and URL's and DHCP or other boot protocols for use where the Internet jack resides on a broadband connection. The Internet jack interface block 101 handles communication with Internet-ready devices.

In the preferred embodiment, total silicon cost for the claimed invention ranges from under $10 on up depending on modem type used and other features incorporated into the device. The invention is thereby cost affordable to build as a standalone device or to embed into other devices that attach to telephone jacks, for example.

It is noted that with new Internet capable phones, answering machines, and fax machines, and the like, the cost of adding an Internet jack is almost negligible because such devices already contain the modem and network stack blocks. Furthermore, most of these devices also include protocol support, so that the only additional cost is for the Internet jack interface and physical connector for Internet-ready devices. Therefore, the added cost of an Internet jack to such devices is under one dollar.

It is noted that other physical Internet connections, such as, for example, cable modems can also be supported. The claimed invention can easily be added to, for example, STB's, Ethernet hubs, or other hubs that attach to any of the new home networking standards.

Figure 2:
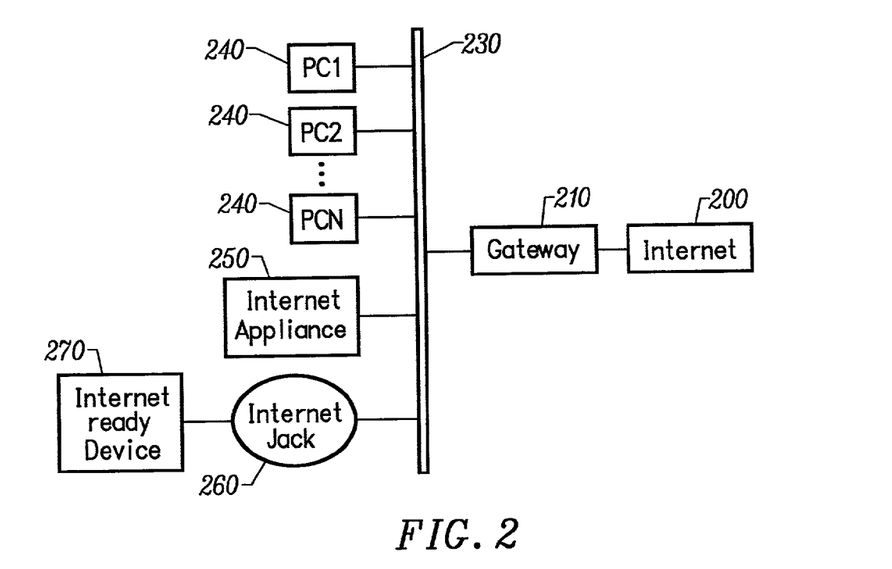
FIG. 2 shows a schematic diagram of a device using the Internet jack according to the invention.

In the latter scenario described herein above, in another preferred embodiment, the Internet jack is a standalone device having a network connection on one end, and an Internet-ready device connector on the other. This implementation is depicted in FIG. 2. The Internet 200 is connected to a Gateway 210 that is connected to a home network 230. Connected to the home network 230 are N PC's 240, an Internet appliance 250 and the Internet jack 260. Connected to the Internet jack is an Internet-ready device 270.

It is noted that examples of a home network 230 include, but are not limited to, a standard Ethernet, telephone line, electrical outlines, and wireless means. Examples of an Internet appliance 250 include, but are by no means limited to, Web TV box, email, and a telephone.

It is noted that in the preferred embodiment, the claimed invention is a closed system that thereby provides additional advantage. As an example, an Internet-ready device provides information such as a URL or mail server name to the Internet jack. The Internet jack connects and then retrieves or sends the information. At no point does the user need to intervene or provide additional information. Also because the system is closed, the Internet connection only goes to the site specified by the appliance.

In one embodiment, a closed system such as described herein above uses a rating system, such as, for example, RSAC effectively on retrieved data. That is, all data must pass through the Internet jack prior to being downloaded to the Internet-ready device. In scenarios where a rating is used, the device would pass a rating level along with the target URL, mail server, or the like. Once data is retrieved from the target URL, mail server, or the like, it is filtered by the Internet jack, whereupon the Internet jack only passes along such data to the Internet-ready appliance if the data does not exceed the stated rating level.

In other embodiments, other security schemes are implemented to prevent accessing information on unauthorized sites. In this situation and in one embodiment, a key code is passed from the device to an Internet site, which then uses a pre-agreed upon algorithm to generate a response. This response is then sent back to the device thus authenticating the site to the device. This same mechanism can be used in the reverse path to prevent unauthorized devices from accessing a particular site.

Example 1

The Talking Toy

Figure 3:
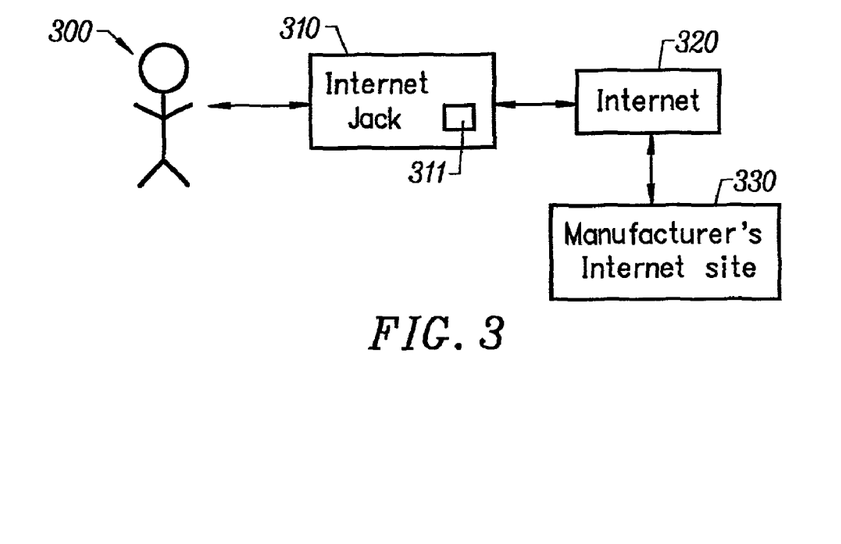
FIG. 3 shows a schematic diagram of a device using the Internet jack according to the invention.

FIG. 3 shows a schematic diagram of a device using the Internet jack according to the invention. The Internet-ready device is a child's talking toy 300 using the Internet jack 310. Instead of being limited to the sounds shipped with the toy, technology now allows a child to update new sounds from a manufacturer's Internet site 330 through the Internet 320. The toy 300 is plugged into the Internet jack 310. The user presses a button 311 on the Internet jack 310. The Internet button on the connection platform 310 then initiates communication between the Internet jack 310 and the toy 300. Specifically, in this embodiment, an announcement byte is sent to the toy 300 from the jack 310. In response the toy 300 sends to the jack 310 a manufacturer's POP server for that particular toy. The Internet jack 310 then connects to the Internet 320, initiates a POP connection to the specified server 330, and retrieves an email message.

In this embodiment, the manufacturer's Internet site 330 is required only to keep one email message in the account, the message conveying the latest sound bytes for the toy. Examples of latest sounds bytes include, but are not limited to, sounds associated with seasonal events such as, for example, holidays, or sounds associated with media, such as, for example, television programs or movie releases. When the sounds file is downloaded onto the Internet jack 310, it is parsed by the jack 310. A typical example of the sound file is a .wav file. The data is decoded by the jack 310 and sent to the toy 300. Typically, for example, the Internet jack 310 strips headers and the like from the file sent by the manufacture's site 330, and only sends the a pure sound file, or .wav file, to the toy 300.

The Internet jack 310 is not required to understand the data because the only service it provides in this situation is to pass requested data to the toy 300. It is the toy that determines the data as new sound data. The toy stores and processes the data accordingly. The toy 300 is required only to have capabilities to communicate with the Internet jack 310 and to store new information it receives. The toy is not required to have any network protocol knowledge or modem capabilities. Therefore, manufacturers can incorporate Internet jack connectivity and usage into products of all price ranges.

Example 2

The Electronic Book

The electronic book is another example of an Internet-ready device. By connecting the electronic book to an Internet jack a user can download new content for the book without using or being required to use a computer. In this example the book provides a URL to the Internet jack. Once a connection is established the requested HTML page is downloaded and sent to the electronic book. Because the Internet-ready device contains an LCD screen, the device displays a list of books from which the user may select. The user selects a choice that causes the device to send to the Internet jack another URL. Requested data is then retrieved and delivered to the electronic book. HTTP can also be used to post credit card information or account numbers for billing purposes. If the electronic book is for a general reader, the book may not have any rating restrictions. However, in cases when the book is a child's book the book may provide along with the target URL a rating level that reflects the level of information it can accept. The resulting downloaded HTML data is then parsed. The ratings tag is checked prior to sending the downloaded requested information to the electronic book.

Figure 4:
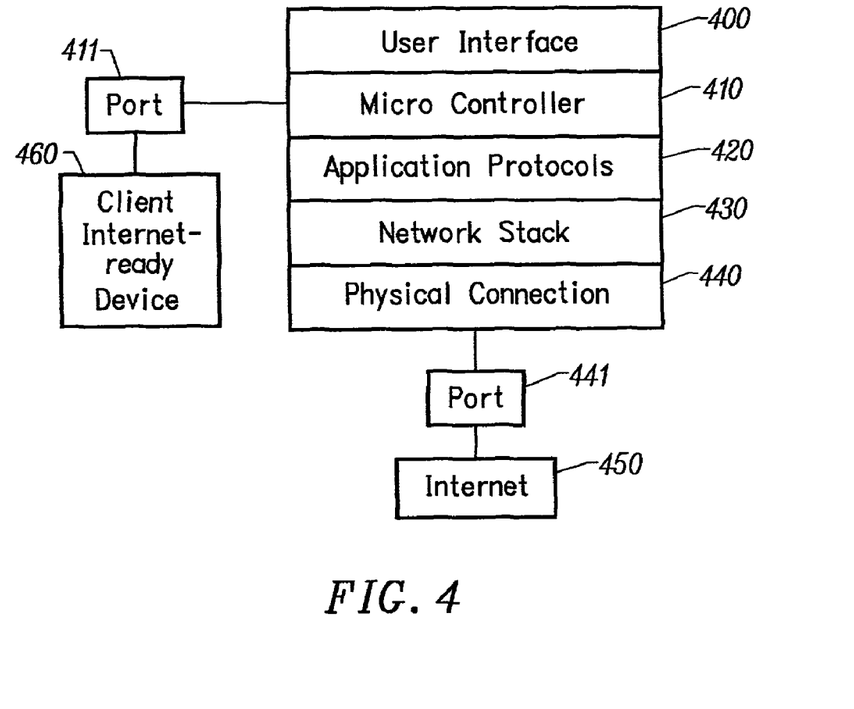
FIG. 4 is a block diagram showing a preferred embodiment of logical blocks according to the invention.

FIG. 4 is a block diagram showing a preferred embodiment of logical blocks according to the invention. A user interface logical block 400 is connected to a micro controller logical block 410. The user interface logical block 400 supports, for example, a display or a keypad, and the like. The micro controller logical block 410 performs such functionality as, for example, parsing and decoding. The micro controller logical block 410 is connected to an application protocols logical block 420. Examples of protocols supported by this block 420 are, but are not limited to, HTTP and POP. The application protocols logical block 420 is connected to a network stack 430. The network stack 430 supports such protocols as but is not limited to, for example, TCT and IP. The network stack 430 is connected to a physical connection logical block 440 that provides but is not limited to, for example, modem support and the Ethernet. The physical connection logical block 440 is connected by a port 441 to the Internet 450. Similarly, the micro controller logical block 410 is connected by a serial port 411 to a client's Internet-ready device 460, such as, for example, a toy.

It is noted that the logical blocks can be implemented in hardware or software.

Another embodiment comprises the same components as in FIG. 4, but omits the user interface logical block 400.

It is noted that the preferred embodiment depicted by FIG. 4 is by no means limited by the limitations of contemporary technological limitations and can be adapted to accommodate technological advances of the future.

Other Devices

In another embodiment, along with provided protocols a raw socket interface is also supported by the claimed invention herein. The raw socket feature allows Internet-ready devices to use protocols, such as, for example, Telnet and RSH that are not necessarily natively supplied by the Internet jack.

When using a raw socket interface, the Internet-ready device supplies information such as, for example, a type of connection requested, such as, for example, TCP/UDP, the target Internet site, such as, for example, a server name, URL, or IP address, and target port number. Any data received by the raw socket connection is passed to the attached Internet-ready device. This operation mode is optional and is not needed for simpler applications.

Figure 5:
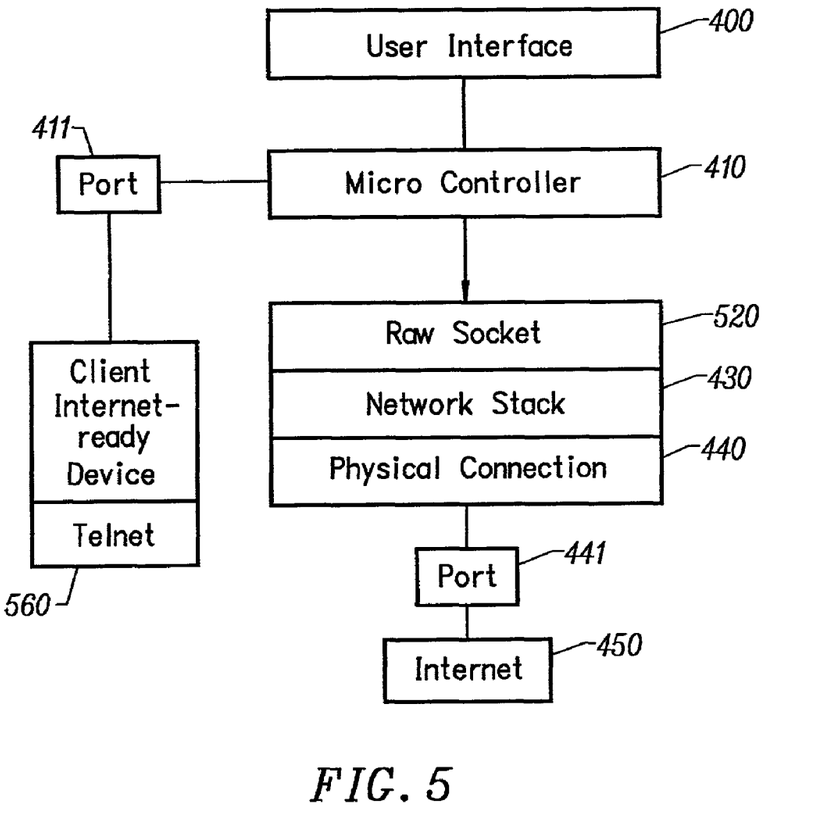
FIG. 5 shows a schematic diagram of another embodiment of the invention in which a raw socket is used directly.

FIG. 5 shows a schematic diagram of another embodiment of the invention depicted in FIG. 4 in which a raw socket is used directly. The user interface logical block 400 is connected to the micro controller logical block 410. The micro controller logical block 410 connects directly to a raw socket layer 520. The raw socket layer 520 is connected to the network stack 430. The network stack 430 is connected to the physical connection logical block 440. The physical connection logical block 440 is connected by a port 441 to the Internet 450. The micro controller logical block 410 is connected by the serial port 411 to a client's Internet-ready device 560 that requires a special protocol, such as, for example, Telnet, a proprietary protocol, or any standard protocol not provided by the Internet jack's application protocols.

Internet Jack Feature Specifications

Table A herein below provides a summary of features provided by the preferred embodiment of the Internet jack invention claimed herein.

TABLE A

| FEATURE | COMMENT |
| --- | --- |
| Full TCP/IP network stack included | |
| Supported Application Protocols | |
| POP3 | |
| SMTP | |
| HTTP | |
| DNS | |
| FTP | |
| DHCP | |
| Raw Socket Support | |
| 4 sockets | |
| Ability to set target and source port numbers | |
| TCP or UDP transport layers | |
| Internet Connection independent | Will work with telephone modems, cable modems, Ethernet, etc. |
| Low Cost | |
| Base64 and Quoted Printable data decoding | |
| Simple "One-Touch" operation | |
| Built in RSAC support | |
| Will support multiple Internet-Ready device connectors | It is expected that along with RS-232, IR and other connector types will be made available. |
| Auto BAUD rate detection for RS-232 type connections | |

SUMMARY

With the advent of Internet-ready devices, a solution to connect these appliances to the Internet in a cost-affordable, safe, and easy to use method is needed. The Internet jack invention claimed herein provides these cited advantages in a well-defined closed system. The Internet jack invention claimed herein is designed to address, among other concepts, a particular market need in a most manufacturer-friendly and user-friendly manner possible in the spirit of the concept that the consumer electronics world is dominated by point solutions.

It is noted that the Internet jack invention does not preclude the use of the PC as a connection platform. The new connection platform claimed herein is compatible with the concept that it is expected that the PC can be used along with the Internet jack to provide a more feature-rich connection environment.

It is noted that communication protocol between Internet-ready devices and the Internet jack invention is the same as that between Internet-ready devices and a computer. Therefore, manufacturers are not required to build multiple versions or a variety of products to compensate for compatibility, wherein compatibility problems are due to specific products depending on specific connection platforms.

For example, citing the talking toy example herein above, a PC stores past files for reloading previous sound bytes. In another example, citing the electronic book example herein above, a PC stores a digital library. In contrast, the Internet jack invention herein provides a simple alternative, low cost, secure, and easy to use substitute for applications that require a PC.

In conclusion, the claimed invention herein provides a solution to the problem of making the new class of Internet-ready appliances a reality because it incorporates necessary networking logic, thereby providing to the market a ubiquitous Internet dial-tone.

The invention claimed is:

1. An apparatus for a user to connect an Internet-ready device to the Internet by an Internet connection independent means, comprising:
    at least two connection ports, wherein the first port connects to an Internet conduit, and the second port connects to said Internet-ready device capable of communicating utilizing Internet-related protocols;
    a user interface, allowing a user to initiate passing information between said Internet-ready device and said Internet, and having associated indicators to indicate to said user that said passing of information that was initiated by said user is complete;

a protocol handler block for receiving and handling messages from said user interface and from said Internet-ready device, and for sending on said handled messages to a network stack block;

said network stack block for handling an associated subset of said handled messages, and sending on to a physical connection block; and said physical connection block for connecting to said Internet.

2. The apparatus in claim 1, wherein said indicators range from simple LED's to small LCD screens, cursor controls, and keyboards and/or keypads.

3. The apparatus in claim 1, further comprising a standard telephone jack connection.

4. The apparatus in claim 1, wherein said physical connection block comprises a data modem.

5. The apparatus of claim 4, wherein said data modem ranges from 2400 bps to 56 kbps, or wherein said data modem is an xDSL or cable modem.

6. The apparatus of claim 5, further comprising a pass through port whereby an existing POTS appliance may be connected.

7. The apparatus of claim 1, wherein said network stack block handles all network, transport layer, and data link layer protocols needed for Internet connectivity.

8. The apparatus of claim 1, wherein said protocol handler provides any of the following application protocols: POP3, SMTP, HTTP, FTP, and DNS.

9. The apparatus of claim 1, whereby said apparatus is built as a standalone device.

10. The apparatus of claim 1, whereby said apparatus is built to be embedded into other devices.

11. The apparatus of claim 1, wherein said data modem is a cable modem.

12. The apparatus of claim 1, wherein said apparatus is capable of being added to at least one of:
set-top-boxes;
Ethernet hubs; and
hubs that are attached to new home networking standards.

13. The apparatus of claim 1, wherein said connection between said Internet-ready device and said Internet is closed in that said user never intervenes to provide additional information.

14. The apparatus of claim 13, wherein said closure of said Internet permits an Internet connection only to a website specified by said Internet-ready device.

15. The apparatus of claim 1, further comprising a rating system, wherein said Internet-ready device passes a rating level to the Internet, whereupon only data not violating said rating level is passed back to said Internet-ready device.

16. The apparatus of claim 15, wherein said rating system is RSAC.

17. The apparatus of claim 1, further comprising security schemes to prevent accessing information of unauthorized sites.

18. The apparatus of claim 17, further comprising a key code for passing from said Internet-ready device to said Internet, whereupon a pre-agreed upon algorithm is used to generate a response, whereupon said response is sent back to said Internet-ready device, thereby authenticating said Internet connection to said Internet-ready device.

19. The apparatus of claim 18, used in reverse to prevent unauthorized Internet-ready devices from accessing a particular site.

20. The apparatus of claim 1, wherein said initiating passing information between said Internet-ready device and said Internet is by said user pressing a button, thereby providing a one-touch operation.

21. The apparatus of claim 1, further comprising raw socket support.

22. The apparatus of claim 21, wherein said raw socket support further comprises at least one of:
support for multiple sockets;
ability to set target and source port numbers; and
TCP or UDP transport layers.

23. The apparatus of claim 1, wherein said protocol handler comprises a micro controller.

24. The apparatus of claim 23, wherein said micro controller provides Base64 and/or quoted printable data decoding.

25. The apparatus of claim 23, wherein said micro controller communicates directly with said Internet-ready device and with a raw socket.

26. The apparatus of claim 1, further comprising multiple Internet-ready device connectors.

27. The apparatus of claim 1, further comprising auto BAUD rate detection for RS-232 type connections.

28. The apparatus of claim 1, wherein said Internet-ready device is embedded into an Internet-capable telephone.

29. The apparatus of claim 1, wherein said Internet-ready device includes a toy which emits sounds that are updated utilizing said Internet.

30. The apparatus of claim 1, wherein said Internet-ready device includes an electronic book.

31. A method for a user to connect an Internet-ready device to the Internet by an Internet connection independent means, comprising:
providing at least two connection ports, wherein the first port connects to an Internet conduit, and the second port connects to said Internet-ready device capable of communicating utilizing Internet-related protocols;
providing a user interface, allowing a user to initiate passing information between said Internet-ready device and said Internet, and having associated indicators to indicate to said user that said passing of information that was initiated by said user is complete;
providing a protocol handler block for receiving and handling messages from said user interface and from said Internet-ready device, and for sending on said handled messages to a network stack block;
providing said network stack block for handling an associated subset of said handled messages, and sending on to a physical connection block; and
providing said physical connection block for connecting to said Internet.

32. The method in claim 31, wherein said indicators range from, simple LED's to small LCD screens, cursor controls, keypads and/or keyboards.

33. The method in claim 31, further comprising providing a standard telephone jack connection.

34. The method in claim 31, wherein said physical connection block comprises a data modem.

35. The method of claim 34, wherein said data modem ranges from 2400 bps to 56 kbps, or wherein said data modem is an xDSL and cable modem.

36. The apparatus of claim 35, further comprising a pass through port whereby an existing POTs appliance may be connected.

37. The method of claim 31, wherein said network stack block handles all network, transport layer, and data link layer protocols needed for Internet connectivity.

38. The method of claim 31, wherein said protocol handler provides any of the following application protocols: POP3, SMTP, HTTP, FTP, and DNS.

39. The method of claim 31, whereby standalone capability is provided.

40. The method of claim 31, whereby embeddable capability into other devices is provided.

41. The method of claim 31, wherein said data modem is a cable modem.

42. The method of claim 31, further providing connectivity to at least one of:
- set-top-boxes;
- Ethernet hubs; and
- hubs that are attached to new home networking standards.

43. The method of claim 31, wherein said connection between said Internet-ready device and said Internet is closed in that said user never intervenes to provide additional information.

44. The method of claim 31, further providing a rating system, wherein said Internet-ready device passes a rating level to the Internet, whereupon only data not violating said rating level is passed back to said Internet-ready device.

45. The method of claim 44, wherein said rating system is RSAC.

46. The method of claim 31, further providing security schemes to prevent accessing information of unauthorized sites.

47. The method of claim 46, further providing a key code for passing from said Internet-ready device to said Internet, whereupon a pre-agreed upon algorithm is used to generate a response, whereupon said response is sent back to said Internet-ready device, thereby authenticating said Internet connection to said Internet-ready device.

48. The method of claim 47, used in reverse to prevent unauthorized Internet-ready devices from accessing a particular site.

49. The method of claim 31, wherein said initiating passing information between said Internet-ready device and said Internet is by said user pressing a button, thereby providing a one-touch operation.

50. The method of claim 31, further providing raw socket support.

51. The method of claim 50, wherein said raw socket support further comprises at least one of:
- support for multiple sockets;
- ability to set target and source port numbers; and
- TCP or UDP transport layers.

52. The method of claim 31, wherein said protocol handler comprises a micro controller.

53. The method of claim 52, wherein said micro controller provides Base64 and/or quoted printable data decoding.

54. The method of claim 52, wherein said micro controller communicates directly with said Internet-ready device and with a raw socket.

55. The method of claim 31, further providing multiple Internet-ready device connectors.

56. The method of claim 31, further providing auto BAUD rate detection for RS-232 type connections.

* * * * *

UNITED STATES PATENT AND TRADEMARK OFFICE
CERTIFICATE OF CORRECTION

PATENT NO.         : 8,135,842 B1                                                Page 1 of 1
APPLICATION NO.    : 10/049972
DATED              : March 13, 2012
INVENTOR(S)        : Johnson et al.

It is certified that error appears in the above-identified patent and that said Letters Patent is hereby corrected as shown below:

In the claims:
Claim 32, col. 10, line 53; please replace "from, simple" with --from simple--.

Signed and Sealed this
Second Day of April, 2013

Teresa Stanek Rea
*Acting Director of the United States Patent and Trademark Office*